US011081723B2

(12) United States Patent
Kawate et al.

(10) Patent No.: US 11,081,723 B2
(45) Date of Patent: Aug. 3, 2021

(54) ENERGY STORAGE DEVICE AND ENERGY STORAGE DEVICE PRODUCTION METHOD

(71) Applicant: GS Yuasa International Ltd., Kyoto (JP)

(72) Inventors: Kenji Kawate, Kyoto (JP); Takao Maki, Kyoto (JP); Takeshi Kawahara, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 83 days.

(21) Appl. No.: 15/760,929

(22) PCT Filed: Sep. 16, 2016

(86) PCT No.: PCT/JP2016/077542
§ 371 (c)(1),
(2) Date: Mar. 16, 2018

(87) PCT Pub. No.: WO2017/047787
PCT Pub. Date: Mar. 23, 2017

(65) Prior Publication Data
US 2018/0269523 A1 Sep. 20, 2018

(30) Foreign Application Priority Data
Sep. 18, 2015 (JP) .............................. JP2015-186090

(51) Int. Cl.
H01M 10/0525 (2010.01)
H01M 10/0587 (2010.01)
(Continued)

(52) U.S. Cl.
CPC ........ *H01M 10/0525* (2013.01); *H01G 11/78* (2013.01); *H01M 4/382* (2013.01);
(Continued)

(58) Field of Classification Search
CPC ............. H01M 10/0525; H01M 10/04; H01M 10/0587; H01M 2/02; H01M 2/04;
(Continued)

(56) References Cited

U.S. PATENT DOCUMENTS

2001/0004505 A1* 6/2001 Kim .................... H01M 2/0473
429/180
2006/0024568 A1 2/2006 Lee
(Continued)

FOREIGN PATENT DOCUMENTS

CN 101350428 A 1/2009
CN 101714624 A 5/2010
(Continued)

*Primary Examiner* — Jimmy Vo
(74) *Attorney, Agent, or Firm* — McGinn I.P. Law Group, PLLC

(57) ABSTRACT

An energy storage device includes: an electrode body including curved portions formed by winding an electrode; a container in which the electrode body is accommodated; and a cover plate structure including a cover plate closing the container. The electrode body is accommodated in the container while one end portion in a winding axis direction of the electrode body faces the cover plate structure. The energy storage device includes spacers (side spacers) that are attached to curved portions, and one end portion of the spacer abuts on a part of the cover plate structure.

11 Claims, 16 Drawing Sheets

(51) Int. Cl.
  *H01M 10/04*   (2006.01)
  *H01G 11/78*   (2013.01)
  *H01M 50/10*   (2021.01)
  *H01M 50/40*   (2021.01)
  *H01M 50/147*  (2021.01)
  *H01M 50/463*  (2021.01)
  *H01M 50/531*  (2021.01)
  *H01M 50/543*  (2021.01)
  *H01M 4/38*    (2006.01)
  *H01M 4/505*   (2010.01)
  *H01M 4/02*    (2006.01)

(52) U.S. Cl.
  CPC ........... *H01M 4/505* (2013.01); *H01M 10/04* (2013.01); *H01M 10/0587* (2013.01); *H01M 50/10* (2021.01); *H01M 50/147* (2021.01); *H01M 50/40* (2021.01); *H01M 50/463* (2021.01); *H01M 50/531* (2021.01); *H01M 50/543* (2021.01); *H01M 2004/027* (2013.01); *H01M 2004/028* (2013.01)

(58) Field of Classification Search
  CPC ............ H01M 2/14; H01M 2/18; H01M 2/26; H01M 2/30; H01M 4/382; H01M 4/505; H01M 4/64; H01M 50/531; H01M 50/40; H01M 50/543; H01M 50/463; H01M 50/10; H01M 50/147
  See application file for complete search history.

(56) References Cited

U.S. PATENT DOCUMENTS

| | | | |
|---|---|---|---|
| 2006/0222937 A1 | 10/2006 | Morimoto et al. | |
| 2011/0311851 A1* | 12/2011 | Shinoda | H01M 2/0482 429/94 |
| 2013/0209859 A1* | 8/2013 | Tsuruta | H01G 9/06 429/142 |
| 2014/0079971 A1* | 3/2014 | Huang | H01M 10/286 429/94 |
| 2014/0329117 A1 | 11/2014 | Kubota et al. | |
| 2015/0380691 A1 | 12/2015 | Tsuruta et al. | |
| 2016/0233540 A1* | 8/2016 | Kato | H01M 2/043 |

FOREIGN PATENT DOCUMENTS

| | | |
|---|---|---|
| CN | 201608211 U | 10/2010 |
| CN | 202339951 U | 7/2012 |
| CN | 202434631 U | 9/2012 |
| CN | 202454658 U | 9/2012 |
| CN | 104916868 A | 9/2015 |
| JP | 2006-040899 A | 2/2006 |
| JP | 2006-278142 A | 10/2006 |
| JP | 2011-049064 A | 3/2011 |
| JP | 2013-110045 A | 6/2013 |
| JP | 2013-161755 A | 8/2013 |
| JP | 2013-191544 A | 9/2013 |
| JP | 2014-011115 A | 1/2014 |

* cited by examiner

ENERGY STORAGE DEVICE AND ENERGY STORAGE DEVICE PRODUCTION METHOD

TECHNICAL FIELD

The present invention relates to an energy storage device and an energy storage device production method.

BACKGROUND ART

Conventionally, there is well known an energy storage device that is assembled by inserting electrode body in a container with a spacer attached to the electrode body (for example, see Patent Document 1).

PRIOR ART DOCUMENT

Patent Document

Patent Document 1: JP-A-2011-216239

SUMMARY OF THE INVENTION

Problems to be Solved by the Invention

When the electrode body is inserted in the container while the spacer is attached to the electrode body, it is necessary to press and push the electrode body itself, and there is a risk of damaging an electrode plate constituting the electrode body such that the electrode body is crushed during the insertion.

An object of the present invention is to provide an energy storage device and a production method thereof, for being able to prevent the damage of the electrode body during the production.

Means for Solving the Problems

An energy storage device according to one aspect of the present invention includes: an electrode body including a curved portion that is formed by winding an electrode; a container in which the electrode body is accommodated; a cover plate structure including a cover plate that closes the container; and a spacer that is attached to the curved portion of the electrode body, one end portion of the spacer abutting on a part of the cover plate structure. The electrode body is accommodated in the container while one end portion in a winding axis direction of the electrode body faces the cover plate structure.

Advantages of the Invention

According to the present invention, the damage of the electrode body can be prevented during the production.

MODE FOR CARRYING OUT THE INVENTION

Figure 1:
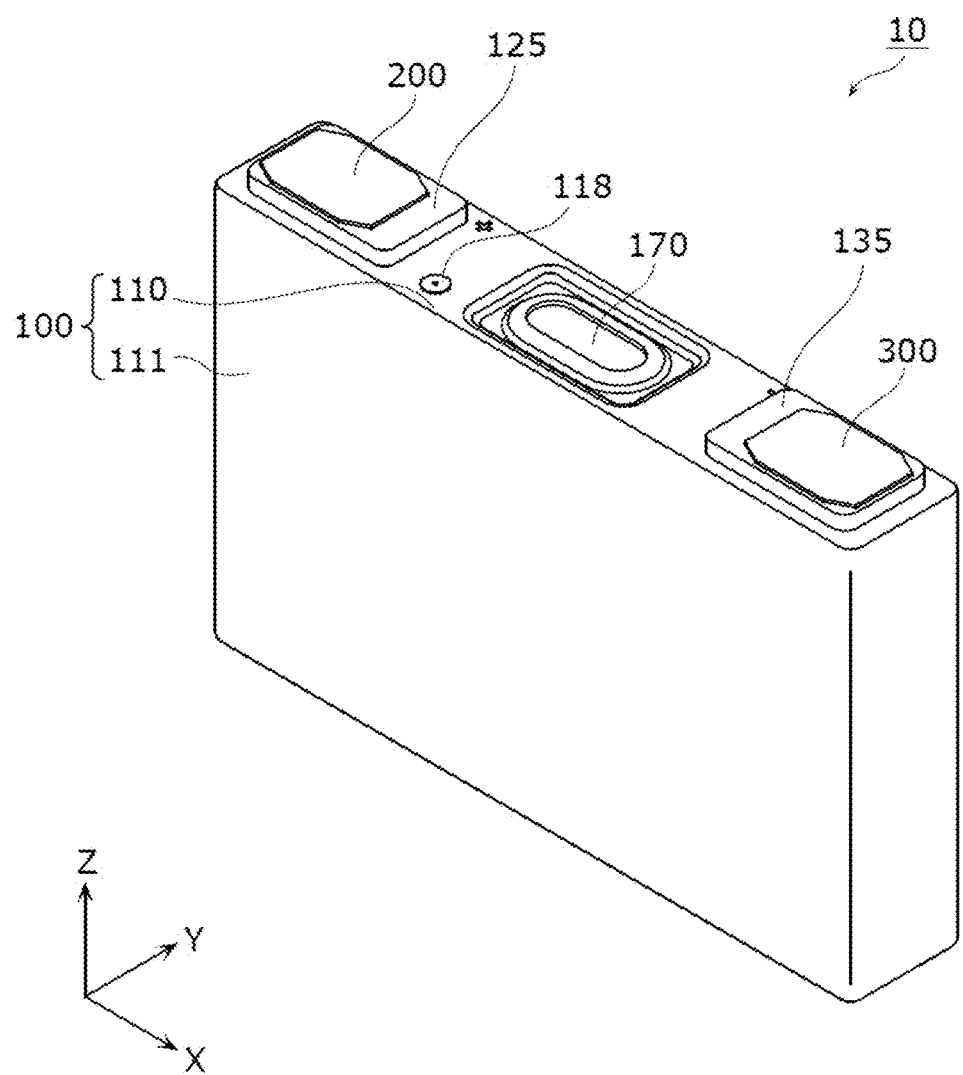
FIG. 1 is a perspective view illustrating an appearance of an energy storage device according to an embodiment.

An energy storage device according to one aspect of the present invention includes: an electrode body including a curved portion that is formed by winding an electrode; a container in which the electrode body is accommodated; a cover plate structure including a cover plate that closes the container; and a spacer that is attached to the curved portion of the electrode body, one end portion of the spacer abutting on a part of the cover plate structure. The electrode body is accommodated in the container while one end portion in a winding axis direction of the electrode body faces the cover plate structure.

In this configuration, because the cover plate structure abuts partially on one end portion of the spacer attached to the electrode body, the electrode body enters the container together with the spacer when the cover plate structure is pressed in assembling the electrode body in the container. Accordingly, even if the electrode body is not directly pressed, the electrode body can be accommodated in the container, and the damage of the electrode body can be prevented during the production.

In the energy storage device, the spacer may extend from one end portion to the other end portion in the winding axis direction of the electrode body.

In this configuration, the spacer extends from one end portion of the electrode body to the other end portion, so that the spacer can be slid to the end with respect to the container when the electrode body is accommodated in the container. Accordingly, the electrode body can easily be guided into the container.

In the energy storage device, the spacer may include a bottom plate, which partially covers the other end portion of the electrode body, in the other end portion in the winding axis direction.

In this configuration, the bottom plate partially covering the other end portion of the electrode body is provided in the other end portion of the spacer, so that the other end portion of the electrode body can be prevented from contacting partially with the container after the electrode body is accommodated in the container. Therefore, the damage of the electrode body can further be prevented.

In the energy storage device, the spacer may include a top plate that is interposed between one end portion and the container in the winding axis direction of the electrode body to cover a part of one end portion of the electrode body.

In this configuration, the top plate partially covering one end portion of the electrode body is provided in the spacer, so that one end portion of the electrode body can be prevented from contacting with the container after the electrode body is accommodated in the container. Therefore, the damage of the electrode body can further be prevented.

In the energy storage device, the spacer may include a positioning unit that positions the cover plate structure, and an engaging unit engaging the positioning unit may be provided in the cover plate structure.

In this configuration, the engaging unit of the cover plate structure engages the positioning unit of the spacer to position the cover plate structure with respect to the spacer. Accordingly, the electrode body can be accommodated in the container while the positional relationship between the spacer and the cover plate structure is stabilized.

In the energy storage device, the cover plate structure may include an insulating member that is disposed between the cover plate and the electrode body, and the engaging unit may be provided in the insulating member.

In this configuration, the insulating member is provided between the cover plate and the electrode body, so that the insulating property between the cover plate and the electrode body can be maintained by the insulating member. The engaging unit is provided in the insulating member, so that the position of the insulating member can be stabilized.

In the energy storage device, one end portion of the spacer may separate from the electrode body in the winding axis direction.

In this configuration, because one end portion of the spacer separates from the electrode body in the winding axis direction, the spacer does not interfere with one end portion of the electrode body even if the cover plate structure is pushed. Therefore, the damage of the electrode body can further be prevented during the production.

In the energy storage device, the cover plate structure may include a current collector, and the electrode body may include a tab that is electrically connected to the current collector.

In this configuration, even if the tab is provided in the electrode body, the damage of the tab can be prevented because the electrode body can be accommodated in the container without directly pressing the electrode body.

An energy storage device according to another aspect of the present invention includes: an electrode body in which an electrode is wound; a container in which the electrode body is accommodated; a cover plate structure including a cover plate that closes the container; and a spacer that is attached to the electrode body, one end portion of the spacer abutting on a part of the cover plate structure. The electrode body is accommodated in the container while one end portion in a winding axis direction of the electrode body faces the cover plate structure.

In this configuration, because the cover plate structure abuts partially on one end portion of the spacer attached to the electrode body, the electrode body enters the container together with the spacer when the cover plate structure is pressed in assembling the electrode body in the container. Accordingly, even if the electrode body is not directly pressed, the electrode body can be accommodated in the container, and the damage of the electrode body can be prevented during the production.

A method according to still another aspect of the present invention is for producing an energy storage device including a container accommodating an electrode body including a curved portion that is formed by winding an electrode; a cover plate structure including a cover plate that closes the container; and a spacer that is attached to the electrode body. At this point, the cover plate structure is pushed while one end portion on the cover plate structure side of the spacer attached to the electrode body abuts on a part of the cover plate structure, and the electrode body is accommodated in the container while one end portion in a winding axis direction of the electrode body faces the cover plate structure.

In this configuration, when the cover plate structure is pushed while one end portion on the spacer abuts on a part of the cover plate structure, because the electrode body is accommodated in the container, the electrode body can be accommodated in the container without directly pressing the electrode body, and the damage of the electrode body can be prevented during the production.

Hereinafter, an energy storage device according to an exemplary embodiment of the present invention will be described with reference to the drawings. Each drawing is a schematic diagram, but not always strict.

The following embodiment illustrates one specific example of the present invention. A shape, a material, a component, disposition position and connection form of the component, and a procedure of production processes in the embodiment are illustrated only by way of example, but do not restrict the present invention. In the components of the embodiment, the component that is not described in an independent claim indicating the highest concept is described as optional component.

An energy storage device 10 of the embodiment will generally be described with reference to FIGS. 1 to 3.

FIG. 1 is a perspective view illustrating an appearance of the energy storage device 10 of the embodiment. FIG. 2 is an exploded perspective view illustrating the energy storage device 10 of the embodiment. FIG. 3 is an exploded perspective view illustrating a cover plate structure 180 of the embodiment. In FIG. 3, broken lines indicate a positive electrode leading plate 145 and a negative electrode leading plate 155, and the positive electrode leading plate 145 and the negative electrode leading plate 155 are connected to a positive electrode current collector 140 and a negative electrode current collector 150, which are included in the cover plate structure 180.

In FIG. 1 and the drawings subsequent to FIG. 1, for convenience, the description is made while a Z-axis direction is set to a vertical direction. However, sometimes the Z-axis direction is not always matched with the vertical direction in an actual use mode.

The energy storage device 10 is a secondary battery that can charge and discharge electricity. Specifically, the energy storage device 10 is a nonaqueous electrolyte secondary battery such as a lithium ion secondary battery. For example, the energy storage device 10 is applied to an electric vehicle (EV), a hybrid electric vehicle (HEV), or a plug-in hybrid electric vehicle (PHEV). The energy storage device 10 is not limited to the nonaqueous electrolyte secondary battery, but may be a secondary battery except for the nonaqueous electrolyte secondary battery or a capacitor.

Figure 2:
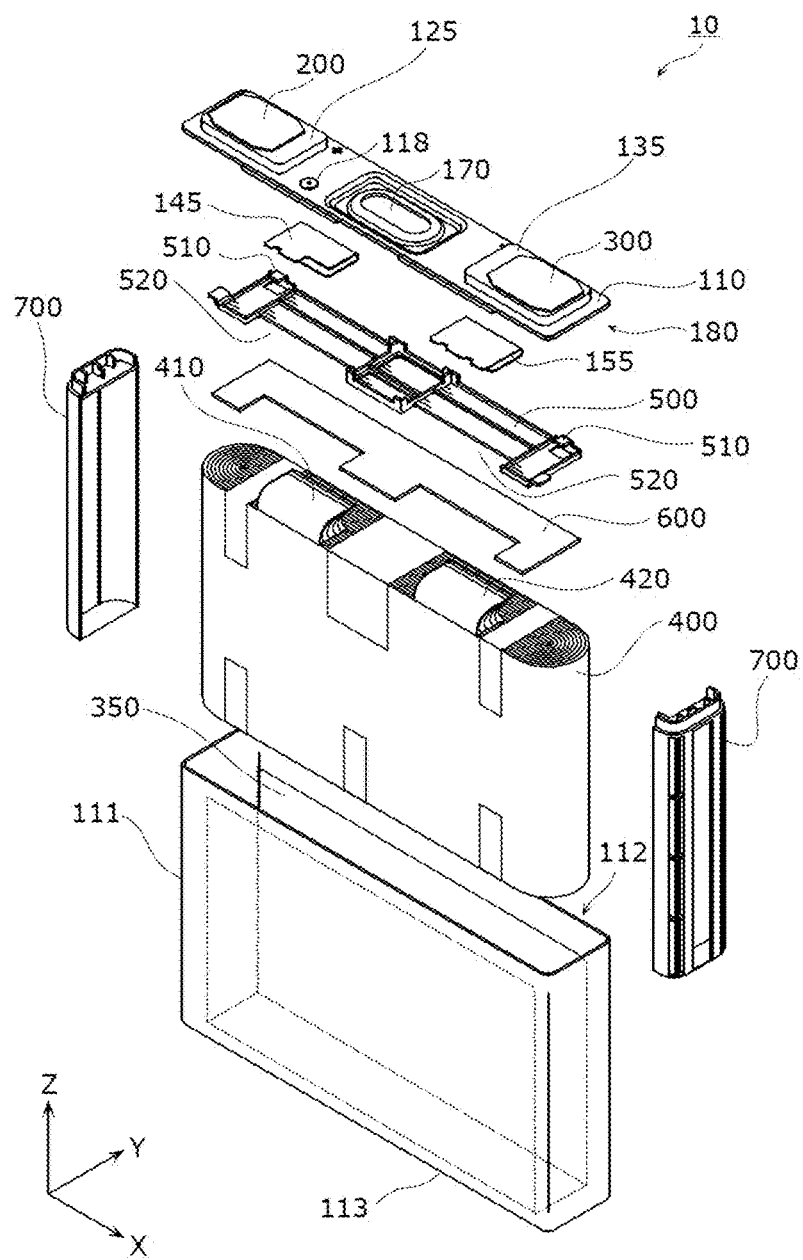
FIG. 2 is an exploded perspective view illustrating the energy storage device of the embodiment.

As illustrated in FIGS. 1 and 2, the energy storage device 10 includes an electrode body 400 and a container 100 that accommodates the electrode body 400 therein. In the embodiment, the cover plate structure 180 that is constructed by disposing various elements on the cover plate 110 of the container 100 is disposed above the electrode body 400. In the container 100, one end portion of the electrode body 400 faces the cover plate structure 180.

The cover plate structure 180 includes a cover plate 110 of the container 100, a positive electrode terminal 200, a negative electrode terminal 300, upper insulating members 125 and 135, lower insulating members 120 and 130, the positive electrode current collector 140, and the negative electrode current collector 150.

The positive electrode terminal 200 is electrically connected to a positive electrode of the electrode body 400 through the positive electrode current collector 140, and the negative electrode terminal 300 is electrically connected to a negative electrode of the electrode body 400 through the negative electrode current collector 150. Each of conductive members, such as the positive electrode terminal 200, which are electrically connected to the electrode body 400, is insulated from the container 100 by insulating members such as the lower insulating member 120.

In each of the upper insulating members 125 and 135 and the lower insulating members 120 and 130, at least a part is the insulating member disposed between the wall portion of the container 100 and the conductive member. In the embodiment, each insulating member is disposed along the cover plate 110 constituting an upper wall portion in six wall portions of the container 100 having a substantially rectangular parallelepiped external form.

In addition to the above configuration, the energy storage device 10 of the embodiment includes an upper spacer 500 and a cushion sheet 600, which are disposed between the cover plate structure 180 and the electrode body 400.

The upper spacer 500 is disposed between the electrode body 400 and the cover plate 110, and includes a latch 510 that is partially latched in the cover plate structure 180.

Specifically, the upper spacer 500 has a flat shape as a whole, and includes two latches 510 and two insertion portions 520 in which the tabs 410 and 420 are inserted (the two insertion portions 520 that the tab 410 and 420 pierce). In the embodiment, the insertion portion 520 is provided into a notch shape in the upper spacer 500. The upper spacer 500 is made of a material, such as polycarbonate (PC), polypropylene (PP), polyethylene (PE), and polyphenylene sulfide resin (PPS), which has an insulating property.

For example, the upper spacer 500 acts as a member that directly or indirectly controls upward movement (direction to the cover plate 110) of the electrode body 400, or a member that prevents a short circuit between the cover plate structure 180 and the electrode body 400. The upper spacer 500 includes the two latches 510, and each of the two latches 510 is latched in an attaching unit 122 or 132 included in the cover plate structure 180.

The cushion sheet 600 is made of a highly flexible, porous material such as foamed polyethylene, and acts as a cushion material between the electrode body 400 and the upper spacer 500.

In the embodiment, a side spacer (spacer) 700 is disposed between a side surface (in the embodiment, both side surfaces in an X-axis direction) in a direction intersecting a direction (Z-axis direction) parallel to the electrode body 400 and cover plate 110 and an inner peripheral surface of the container 100 in the electrode body 400. For example, the side spacer 700 has a function of controlling a position of the electrode body 400. A specific configuration of the side spacer 700 is described later.

Figure 3:
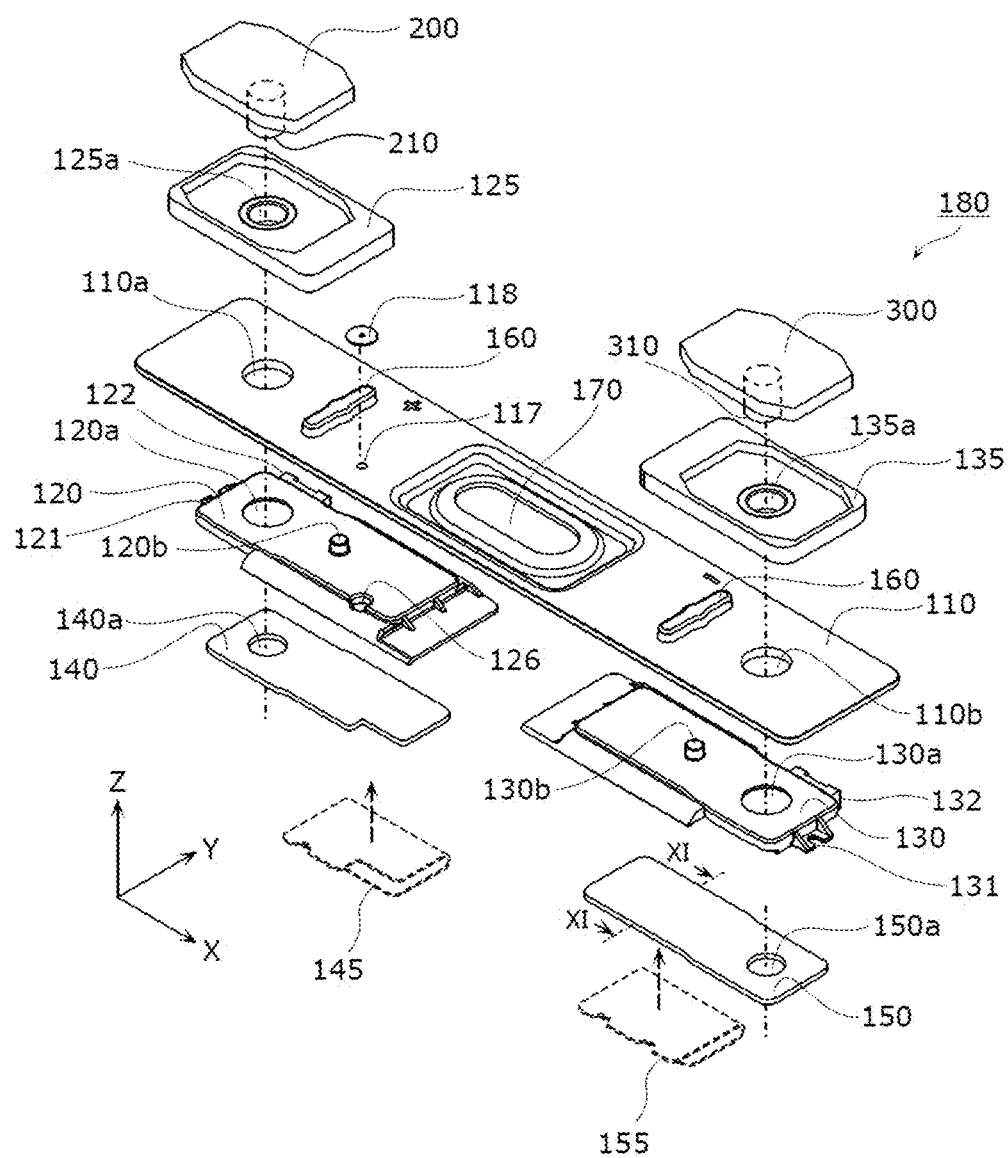
FIG. 3 is an exploded perspective view illustrating a cover plate structure of the embodiment.

In addition to the components in FIGS. 1 to 3, the energy storage device 10 may include another element, such as a cushion sheet disposed between the electrode body 400 and a bottom 113 of the container 100 (main body 111). Although an electrolyte solution (nonaqueous electrolyte) is sealed in the container 100 of the energy storage device 10, the electrolyte solution is not illustrated.

The container 100 includes the main body 111 and the cover plate 110. There is no particular limitation to a material for the main body 111 and the cover plate 110. For example, the main body 111 and the cover plate 110 are made of weldable metal such as stainless steel, aluminum, and aluminum alloy.

The main body 111 is formed into a tubular body having a rectangular shape in a plan view. The main body 111 includes an accommodation recess 112 having a rectangular shape in a plan view and a bottom 113. An insulating sheet 350 covering the electrode body 400 is provided in the main body 111.

The cover plate 110 is welded after the electrode body 400, the insulating sheet 350, and the like are accommodated in the accommodation recess 112, whereby the inside of the main body 111 is sealed.

The cover plate 110 is a plate-like member that closes the accommodation recess 112. As illustrated in FIGS. 2 and 3, a safety valve 170, an electrolyte solution filling port 117, through-holes 110a and 110b, and two swelling units 160 are formed in the cover plate 110. The safety valve 170 is opened when an inner pressure of the container 100 increases, whereby the safety valve 170 has a function of releasing gas in the container 100.

The electrolyte solution filling port 117 is a through-hole through which the electrolyte solution is poured in producing the energy storage device 10. As illustrated in FIGS. 1 to 3, an electrolyte solution filling plug 118 is disposed in the cover plate 110 in order to close the electrolyte solution filling port 117. That is, in producing the energy storage device 10, the electrolyte solution is poured into the container 100 from the electrolyte solution filling port 117 into the container 100, and the electrolyte solution filling plug 118 is welded to the cover plate 110 to close the electrolyte solution filling port 117, thereby accommodating the electrolyte solution in the container 100.

Any solution can be selected as the electrolyte solution sealed in the container 100 without restriction as long as the solution does not damage performance of the energy storage device 10.

In the embodiment, each of the two swelling units 160 is provided in the cover plate 110 by forming a part of the cover plate 110 into a swelling shape. For example, the two swelling unit 160 is used to position the upper insulating member 125 or 135. A recess (not illustrated) that is concave upward is formed on a rear side (the side opposite to the electrode body 400) of the swelling unit 160, and an engagement projection 120b or 130b of the lower insulating member 120 or 130 engages a part of the recess. Therefore, the lower insulating member 120 or 130 is positioned, and fixed to the cover plate 110 at this point.

The upper insulating member 125 electrically insulates the positive electrode terminal 200 from the cover plate 110. The lower insulating member 120 electrically insulates the positive electrode current collector 140 from the cover plate 110. The upper insulating member 135 electrically insulates the negative electrode terminal 300 from the cover plate 110. The lower insulating member 130 electrically insulates the negative electrode current collector 150 from the cover plate 110. For example, sometimes the upper insulating members 125 and 135 are referred to as an upper gasket, and the lower insulating members 120 and 130 are referred to as a lower gasket. That is, in the embodiment, the upper insulating members 125 and 135 and the lower insulating members 120 and 130 have a function of sealing gaps between the electrode terminals (200 and 300) and the container 100.

Similarly to the upper spacer 500, the upper insulating members 125 and 135 and the lower insulating members 120 and 130 are made of the material, such as PC, PP, PE, or PPS, which has the insulating property. In the lower insulating member 120, a through-hole 126 guiding the electrolyte solution flowing from the electrolyte solution filling port 117 toward the electrode body 400 is made in a portion located immediately below the electrolyte solution filling port 117.

Engaging units 121 and 131 engaging the side spacer 700 are provided in the lower insulating member 120 and 130, respectively. Specifically, each of the engaging units 121 and 131 projects from one end on an outside of each of the lower insulating members 120 and 130. When the engaging units 121 and 131 engage the side spacer 700, the lower insulating members 120 and 130 are positioned with respect to the side spacer 700. Therefore, the cover plate structure 180 is positioned with respect to the side spacer 700. An engagement state between the engaging units 121 and 131 and the side spacer 700 is described later.

As illustrated in FIGS. 1 to 3, the positive electrode terminal 200 is electrically connected to the positive electrode of the electrode body 400 through the positive electrode current collector 140. The negative electrode terminal 300 is electrically connected to the negative electrode of the electrode body 400 through the negative electrode current collector 150. That is, the positive electrode terminal 200 and the negative electrode terminal 300 are a metallic electrode terminal used to introduce electricity stored in the electrode body 400 to an outer space of the energy storage device 10, or to introduce the electricity to an inner space of the energy storage device 10 in order to store the electricity in the electrode body 400. The positive electrode terminal 200 and the negative electrode terminal 300 are made of aluminum or aluminum alloy.

A fastening unit 210 is provided in the positive electrode terminal 200 in order to fasten the container 100 and the positive electrode current collector 140 to each other. A fastening unit 310 is provided in the negative electrode terminal 300 in order to fasten the container 100 and the negative electrode current collector 150 to each other.

The fastening unit 210 is a member (rivet) extending downward from the positive electrode terminal 200, and the fastening unit 210 is inserted and caulked in a through-hole 140a of the positive electrode current collector 140. Specifically, the fastening unit 210 is inserted and caulked in a through-hole 125a of the upper insulating member 125, the through-hole 110a of the cover plate 110, a through-hole 120a of the lower insulating member 120, and a through-hole 140a of the positive electrode current collector 140. Therefore, the positive electrode terminal 200 and the positive electrode current collector 140 are electrically connected to each other, and the positive electrode current collector 140 is fixed to the cover plate 110 together with the positive electrode terminal 200, the upper insulating member 125, and the lower insulating member 120.

The fastening unit 310 is a member (rivet) extending downward from the negative electrode terminal 300, and the fastening unit 310 is inserted and caulked in the through-hole 150a of the negative electrode current collector 150. Specifically, the fastening unit 310 is inserted and caulked in a through-hole 135a of the upper insulating member 135, the through-hole 110b of the cover plate 110, the through-hole 130a of the lower insulating member 130, and the through-hole 150a of the negative electrode current collector 150. Therefore, the negative electrode terminal 300 and the negative electrode current collector 150 are electrically connected to each other, and the negative electrode current collector 150 is fixed to the cover plate 110 together with the negative electrode terminal 300, the upper insulating member 135, and the lower insulating member 130.

The fastening unit 210 may be formed integrally with the positive electrode terminal 200, or the fastening unit 210 that is prepared separately from the positive electrode terminal 200 may be fixed to the positive electrode terminal 200 by a technique such as caulking and welding. The same holds true for a relationship between the fastening unit 310 and the negative electrode terminal 300.

The positive electrode current collector 140 is disposed between the electrode body 400 and the container 100 to electrically connect the electrode body 400 and the positive electrode terminal 200. The positive electrode current collector 140 is made of aluminum or aluminum alloy. In the embodiment, the positive electrode current collector 140 is electrically connected to the tab 410 on the positive electrode side of the electrode body 400 through the positive electrode leading plate 145 of the leading plate. Similarly to the positive electrode current collector 140, the positive electrode leading plate 145 is made of aluminum or aluminum alloy The negative electrode current collector 150 is disposed between the electrode body 400 and the container 100 to electrically connect the electrode body 400 and the negative electrode terminal 300. The negative electrode current collector 150 is made of copper or copper alloy. In the embodiment, the negative electrode current collector 150 is electrically connected to the tab 420 on the negative electrode side of the electrode body 400 through the negative electrode leading plate 155 of the leading plate. Similarly to the negative electrode current collector 150, the negative electrode leading plate 155 is made of copper or copper alloy.

A connection portion of the current collector and the tab with the leading plate interposed therebetween is described in detail later.

A configuration of the electrode body 400 will be described below with reference to FIG. 4.

Figure 4:
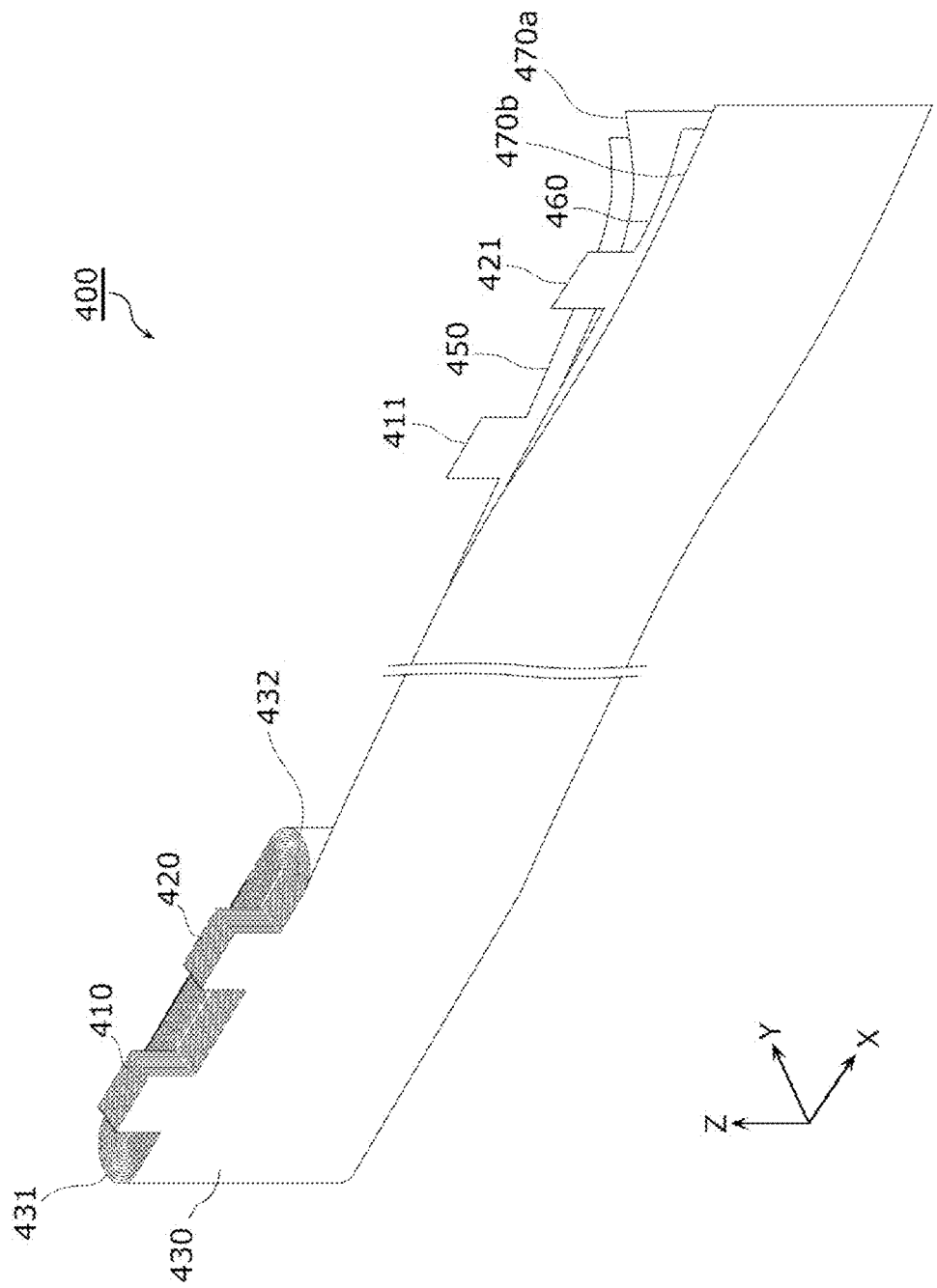
FIG. 4 is a perspective view illustrating a configuration of an electrode body of the embodiment.

FIG. 4 is a perspective view illustrating the configuration of the electrode body 400 of the embodiment. In FIG. 4, a winding state of the electrode body 400 is illustrated while partially developed.

The electrode body 400 is a power generation element in which the electricity can be stored. The electrode body 400 is formed by alternately laminating and winding a positive electrodes 450 and a negative electrode 460 and separators 470a and 470b. That is, the positive electrode 450, the separator 470a, the negative electrode 460 and the separator 470b are laminated in this order, and wound such that sections of the positive electrode 450, the separator 470a, the negative electrode 460 and the separator 470b are formed into an oval shape, thereby forming the electrode body 400.

The positive electrode 450 is an electrode plate in which a positive active material layer is formed on a surface of a positive electrode substrate layer of an elongated belt-like metallic foil made of aluminum or aluminum alloy. Any well-known material can properly be used as the positive active material for the positive active material layer as long as the material can occlude and emit lithium ions. For example, polyanion compounds such as $LiMPO_4$, $LiMSiO_4$, and $LiMBO_3$ (M is one or at least two kinds of transition metals selected from Fe, Ni, Mn, Co, and the like), spinel compounds such as lithium titanate and lithium manganate, and lithium transition metal oxides such as $LiMO_2$ (M is one or at least two kinds of transition metals selected from Fe, Ni, Mn, Co, and the like) can be used as the positive active material.

The negative electrode 460 is an electrode plate in which a negative active material layer is formed on a surface of a negative electrode substrate layer of an elongated belt-like metallic foil made of copper or copper alloy. Any well-known material can properly be used as the negative active material for the negative active material layer as long as the material can occlude and emit lithium ions. Example of the negative active materials include lithium metal, lithium alloy (lithium metal-containing alloys such as lithium-aluminum, lithium-lead, lithium-tin, lithium-aluminum-tin, lithium-gallium, and Wood's metal), alloys that can occlude and emit lithium, carbon materials (such as graphite, non-graphitizing carbon, graphitizing carbon, low-temperature sintered carbon, and amorphous carbon), metal oxides, lithium metal oxides (such as $Li_4Ti_5O_{12}$), and polyphosphoric acid compounds.

The separators 470a and 470b are microporous sheet made of resin. Any well-known material can properly be used as the material for the separators 470a and 470b used in the energy storage device 10 as long as the material does not degrade performance of the energy storage device 10.

The positive electrode 450 includes plural projections 411 that project outward at one end in a winding axis direction. Similarly, the negative electrode 460 includes plural projections 421 that project outward at one end in the winding axis direction. The plural projections 411 and the plural projections 421 are a portion (active material uncoated portion) in which the substrate layer is exposed while not coated with the active material.

As used herein, the winding axis means a virtual axis that becomes a center axis about which the positive electrode 450 and the negative electrode 460 are wound. In the embodiment, the winding axis is a straight line passing through the center of the electrode body 400 in parallel to the Z-axis direction.

The plural projections 411 and the plural projections 421 are disposed at the end (the end on the positive side of the Z-axis direction in FIG. 4) on the identical side in the winding axis direction, and the positive electrode 450 and the negative electrode 460 are laminated, thereby laminating the plural projections 411 and the plural projections 421 at predetermined positions of the electrode body 400. Specifically, the positive electrode 450 is wound and laminated to laminate the plural projections 411 at the predetermined position in a circumferential direction at one end in the winding axis direction. The negative electrode 460 is wound and laminated to laminate the plural projections 421 at the predetermined position different from the position where the plural projections 411 are laminated in the circumferential direction at one end in the winding axis direction.

Resultantly, the tab 410 formed by laminating the plural projections 411 and the tab 420 formed by laminating the plural projections 421 are formed in the electrode body 400. For example, the tab 410 is collected toward the center in the laminating direction, and joined to the positive electrode leading plate 145 by ultrasonic welding. For example, the tab 420 is collected toward the center in the laminating direction, and joined to the negative electrode leading plate 155 by ultrasonic welding. The positive electrode leading plate 145 joined to the tab 410 is joined to the positive electrode current collector 140, and the positive electrode leading plate 145 joined to the tab 420 is joined to the negative electrode current collector 150.

The tab (410 and 420) introduces and leads out the electricity in the electrode body 400, and sometimes other names such as "lead" and a "current collector" are given to the tab.

The tab 410 does not contribute power generation because the tab 410 is formed by laminating the projection 411 of the portion in which the substrate layer is exposed. Similarly, the tab 420 does not contribute the power generation because the tab 420 is formed by laminating the projection 421 of the portion in which the substrate layer is exposed. On the other hand, in the electrode body 400, a portion other than the tabs 410 and 420 contributes the power generation because the portion is formed by laminating the portion in which the active material is coated with the substrate layer. Hereinafter, the portion other than the tabs 410 and 420 is referred to as a body portion 430. Both end portions in an X-axis direction of the body portion 430 constitute curved portions 431 and 432 in which outer peripheral surfaces are bent. Thus, the electrode body 400 is formed into an oval shape having the curved portions 431 and 432.

Figure 9:
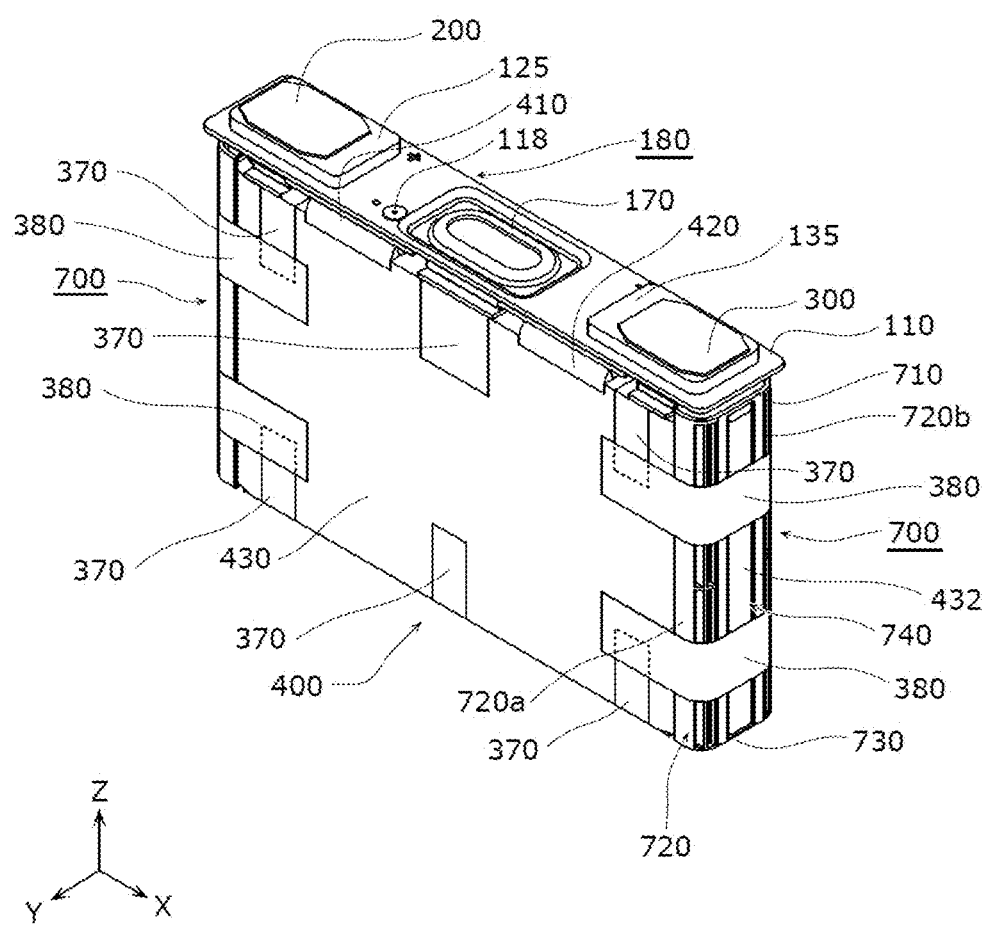
FIG. 9 is a perspective view illustrating an assembly state of the side spacer and the electrode body of the embodiment.

In order to prevent a winding deviation, an adhesive tape 370 is attached to three points of each of one end portion and the other end portion in a winding axis direction (Z-axis direction) of the body portion 430 (see FIG. 9).

Figure 5:
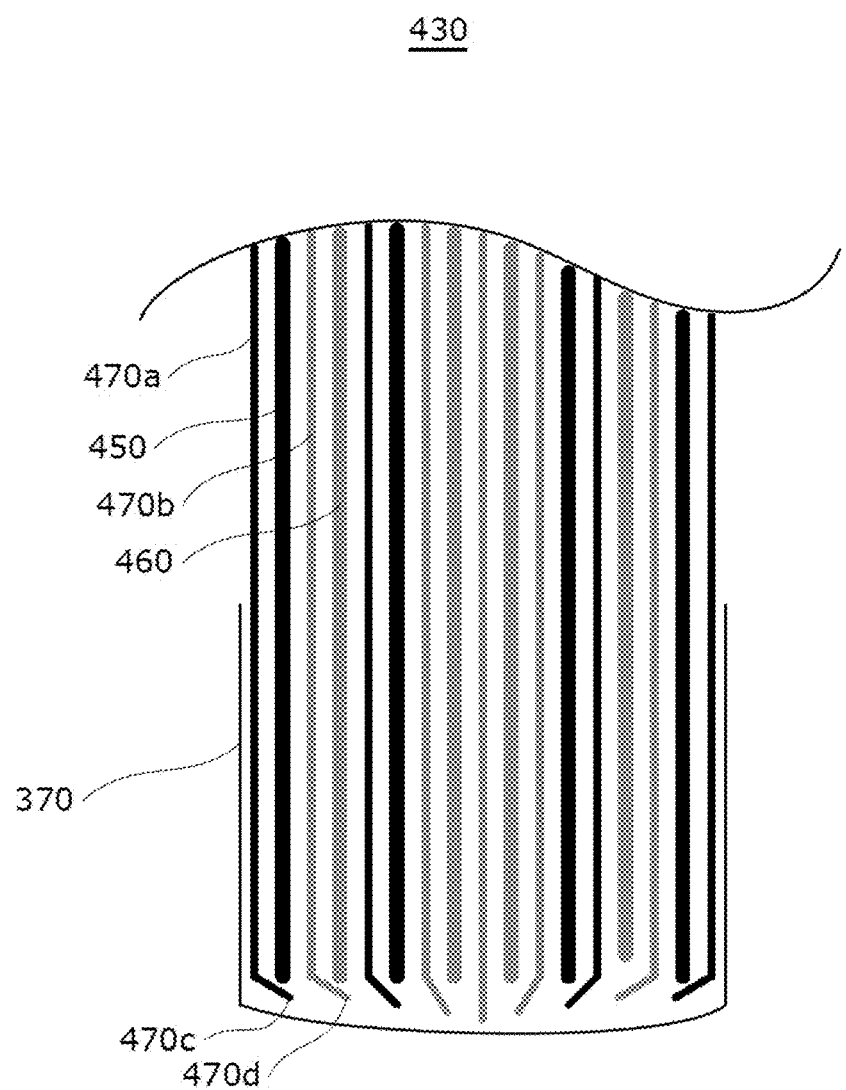
FIG. 5 is a sectional view schematically illustrating an adhesion state of an adhesive tape to a body portion of the electrode body of the embodiment.

FIG. 5 is a sectional view schematically illustrating an adhesion state of the adhesive tape 370 to the body portion 430 of the electrode body 400.

FIG. 5 illustrates the states of one adhesive tape 370 adhering to a lower end portion of the body portion 430 and the positive electrode 450, negative electrode 460, and separators 470a and 470b, which are sandwiched between both end portions of the adhesive tape 370. The same holds for the adhesion state in other adhesive tapes 370, and the description is omitted. In FIG. 5, for convenience, the positive electrode 450, the negative electrode 460, and the separators 470a and 470b do not correspond to the actual winding numbers.

As illustrated in FIG. 5, the end portions of the separators 470a and 470b stick out of the positive electrode 450 and the negative electrode 460. The end portions of the adhesive tape 370 adhere to the outer peripheral surface of the body portion 430 so as to bring the stick-out portions 470c and 470d of the separators 470a and 470b close to the center. Therefore, even in the portion in which the adhesive tape 370 does not exist, the stick-out portion 470c and 470d of the separator 470a and 470b close the end portion of the body portion 430, and a foreign substance is prevented from mixing into the body portion 430 while the winding deviation of the body portion 430 is suppressed.

A specific configuration of the side spacer 700 will be described below.

Figure 6:
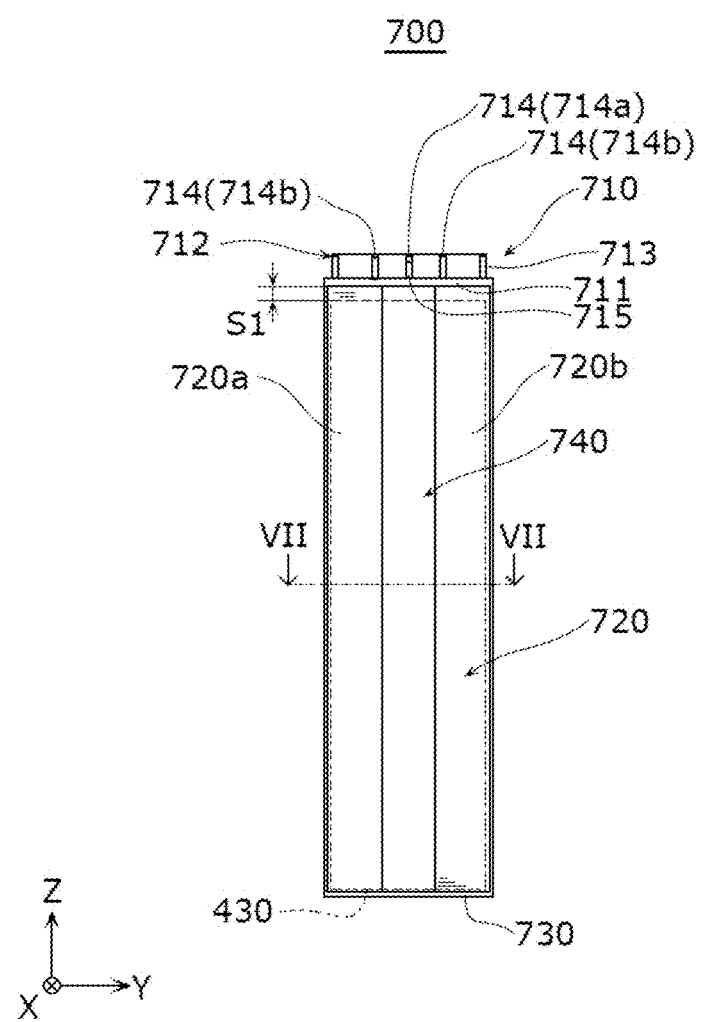
FIG. 6 is a front view illustrating a side spacer of the embodiment when the side spacer is viewed from an inside.
Figure 7:
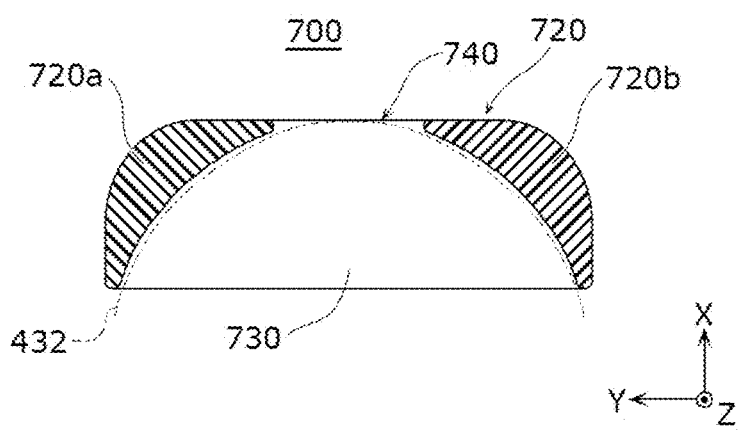
FIG. 7 is a sectional view of the side spacer taken on an XY-plane passing through a line VII-VII in FIG. 6.
Figure 8:
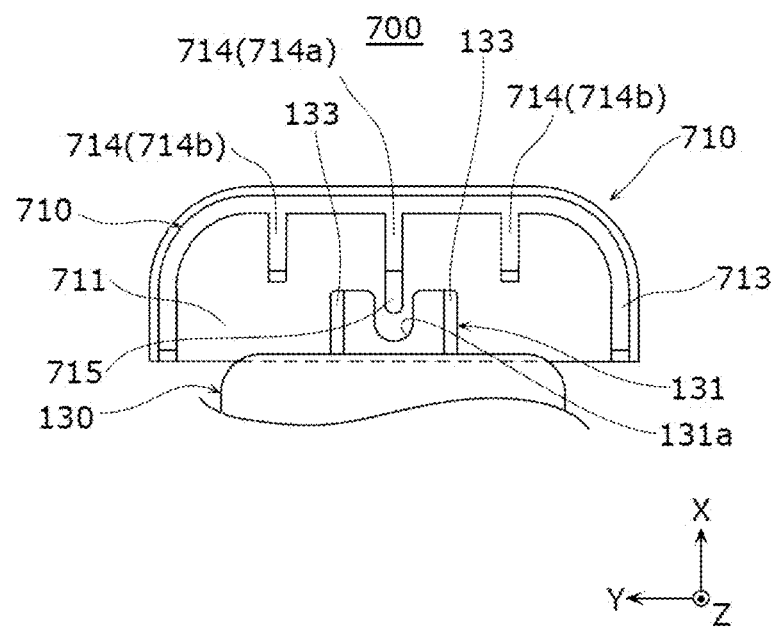
FIG. 8 is a plan view illustrating the side spacer of the embodiment.

FIG. 6 is a front view illustrating the side spacer 700 of the embodiment when the side spacer 700 is viewed from an inside. FIG. 7 is a sectional view of the side spacer 700 taken on an XY-plane passing through a line VII-VII in FIG. 6. FIG. 8 is a plan view illustrating the side spacer 700 of the embodiment. In FIG. 6, the external form of the body portion 430 of the electrode body 400 is indicated by an alternate long and two short dashes line. FIG. 8 illustrates the state in which the engaging unit 131 of the lower insulating member 130 engages the side spacer 700. The same hold for the positive electrode side, and the description is omitted.

As illustrated in FIGS. 6 to 8, the side spacer 700 is an elongated member extending in the winding axis direction (Z-axis direction), and is constructed with a material, such as PC, PP, PE, or PPS, which has an insulating property. The side spacer 700 includes a base 710, a wall 720, and a bottom plate 730.

The base 710 includes a top plate 711 and a wall portion 712.

When viewed from above, the top plate 711 is formed into a substantially rectangular shape in which a pair of corners is partially rounded. The wall portion 712 is formed in a top surface of the top plate 711.

The wall portion 712 includes a peripheral wall 713 and an inner wall 714.

While a portion corresponding to one side of the top plate 711 is opened in the peripheral wall 713, the peripheral wall 713 is vertically provided from the top plate 711 along other sides of the top plate 711. The three inner walls 714 are disposed inside the peripheral wall 713. The inner walls 714 are vertically provided from the top plate 711 in parallel to one another, and the inner walls 714 extend inward while being connected to the peripheral wall 713. End surfaces in the Z-axis direction of the peripheral wall 713 and the inner walls 714 are flush with one another. In the three inner walls 714, an inner wall 714a disposed in the center is formed longer than two inner walls 714b in the X-axis direction. A leading end portion of the central inner wall 714a is a positioning unit 715 that the engaging units 121 and 131 of the lower insulating members 120 and 130 engage.

The wall 720 extends in the Z-axis direction, the top plate 711 is joined to one end portion of the wall 720, and the bottom plate 730 is joined to the other end portion. In a central portion in a Y-axis direction of the wall 720, an opening 740 is formed to open the wall 720. The opening 740 is formed along the Z-axis direction so as to open the wall 720 from the top plate 711 to the bottom plate 730.

In the wall 720, portions that face each other with respect to the opening 740 are referred to as a first wall 720a and a second wall 720b. The first wall 720a and the second wall 720b are formed into a uniform shape from one end to the other end in the Z-axis direction. As to sectional shapes of the first wall 720a and second wall 720b, an inner surface becomes a smooth concave surface as a whole as illustrated in FIG. 7. On the other hand, an outer surface of the first wall 720a and second wall 720b becomes a smooth convex surface as a whole so as to correspond to the inner surface shape of the main body 111 of the container 100.

Similarly to the top plate 711, when viewed from above, the bottom plate 730 is formed into a substantially rectangular shape in which the corner is partially rounded. The wall 720 is joined to the top surface of the bottom plate 730.

A state in which the side spacer 700 is assembled in the electrode body 400 will be described below with reference to FIGS. 7 and 9.

FIG. 9 is a perspective view illustrating an assembly state of the side spacer 700 and the electrode body 400 of the embodiment.

As illustrated in FIG. 9, the side spacers 700 are separately attached to the curved portions 431 and 432 of the electrode body 400. Specifically, the side spacer 700 is attached to the electrode body 400 such that one end portion to the other end portion in the winding axis direction of each of the curved portions 431 and 432 is accommodated in the opening 740.

In FIG. 7, the external form of the curved portion 432 is indicated by an alternate long and two short dashes line. Because the curved portions 431 and 432 have the substantially identical external form, a positional relationship between the side spacer 700 and the curved portion 432 is described by way of example, and the description of a positional relationship between the side spacer 700 and the curved portion 431 is omitted. As illustrated in FIG. 7, the side spacer 700 is attached to the electrode body 400 such that the outer surface of the wall 720 is flush with a part of the surface of the curved portion 432. At this point, a part of the surface of the curved portion 432 is an area including the top of the curved portion 432. Therefore, the curved portion 432 is accommodated in the opening 740 of the side spacer 700. Because the inner surface of the wall 720 becomes the concave surface, the inner surface of the wall 720 abuts on the surface of the curved portion 432 to stabilize the form of the curved portion 432 without destroying the curved surface shape of the curved portion 432.

As illustrated in FIG. 9, the side spacer 700 is fixed to the body portion 430 of the electrode body 400 by an adhesive tape 380. Specifically, in the side spacer 700, two points separated by a predetermined gap from each other in the Z-axis direction are fixed to the body portion 430 by the adhesive tape 380.

When the side spacer 700 is fixed to the body portion 430 of the electrode body 400, the side spacer 700 extends from one end portion to the other end portion of the body portion 430 in the winding axis direction as illustrated in FIG. 9. At this point, the bottom plate 730 of the side spacer 700 covers the other end portion of the body portion 430. The base 710 that is of one end portion of the side spacer 700 separates from one end of the body portion 430 by a predetermined gap S1 in the winding axis direction.

A connection state of the side spacer 700 and the lower insulating members 120 and 130 will be described below with reference to FIG. 8.

The connection state of the side spacer 700 and the lower insulating member 120 is identical to the connection state of the side spacer 700 and the lower insulating member 130. Therefore, the connection state of the lower insulating member 130 and the side spacer 700 are described by way of example, and the description of the connection state of the lower insulating member 120 and the side spacer 700 is omitted.

As illustrated in FIG. 8, the engaging unit 131 projects from one end on the outside of the lower insulating member 130. Ribs 133 extending across a total length of the engaging unit 131 are provided at both side portions of the engaging unit 131. The ribs 133 enhance strength of the whole engaging unit 131. A recess 131a that is recessed along the X-axis direction is provided in the center at the leading end of the engaging unit 131. The recess 131a engages the positioning unit 715 on the top plate 711 of the side spacer 700. Specifically, the recess 131a is pierced in the Z-axis direction, and opened on the positive side in the X-axis direction, so that the recess 131a can engage the positioning unit 715 from the Z-axis direction and the X-axis direction. When the recess 131a engaging the positioning unit 715, movement in the direction intersecting the Z-axis direction of the recess 131a, more specifically, the movement in the Y-axis direction of the recess 131a is restricted by the positioning unit 715. That is, because the movement in the Y-axis direction of the whole lower insulating member 130 is restricted, the movement in the Y-axis direction of the cover plate structure 180 including the lower insulating member 130 is also restricted to position the cover plate structure 180

Figure 10:
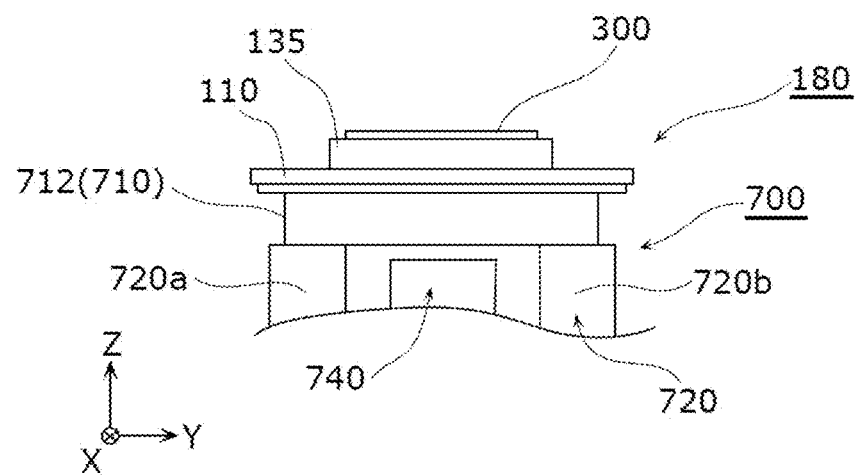
FIG. 10 is a side view illustrating a positional relationship between a cover plate structure and the side spacer of the embodiment.

FIG. 10 is a side view illustrating a positional relationship between the cover plate structure 180 and the side spacer 700 of the embodiment.

As illustrated in FIG. 10, the base 710 that is of one end portion of the side spacer 700 abuts on the cover plate 110 that is of a part of the over plate structure 180. Specifically, one end surface of the wall portion 712 of the base 710 abuts on the cover plate 110. Even in this state, as described above, the base 710 separates from one end of the body portion 430 of the electrode body 400 by the predetermined gap S1 in the winding axis direction (see FIG. 6). Therefore, even if the cover plate structure 180 is pressed from above, the force pressing the cover plate structure 180 is prevented from acting on one end portion of the body portion 430.

A configuration example of the connection portion of the current collector and the tab with the leading plate interposed therebetween will be described below with reference to FIG. 11.

Figure 11:
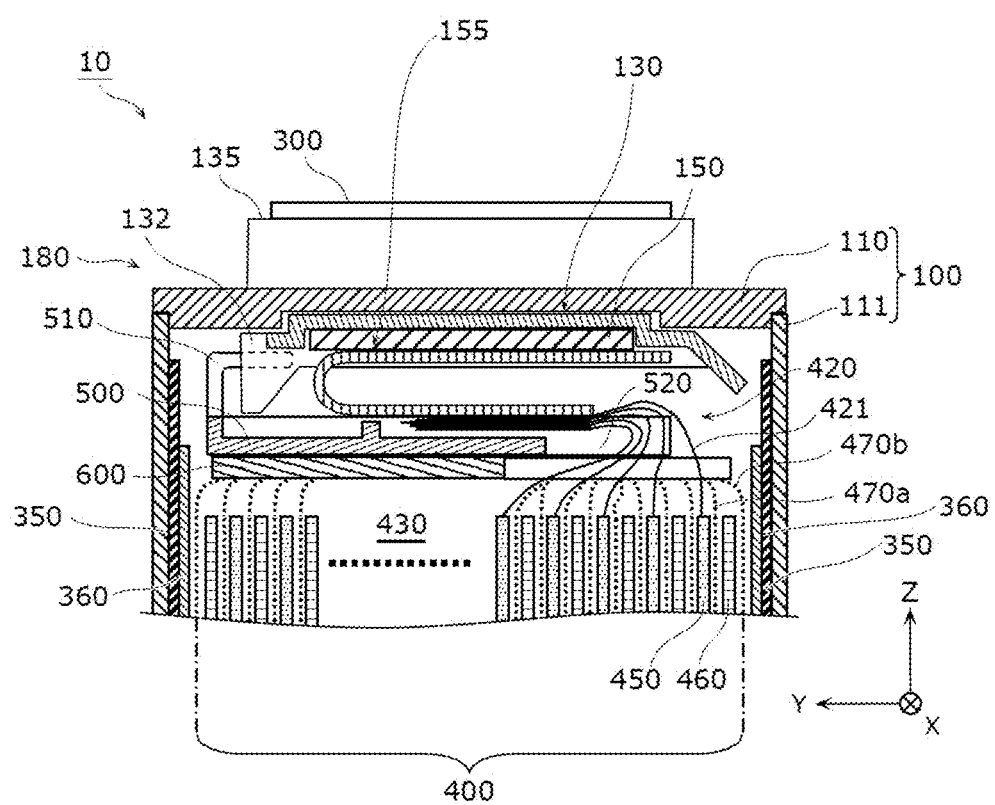
FIG. 11 is a sectional schematic diagram illustrating the cover plate structure of the embodiment and a surrounding structure thereof.

FIG. 11 is a sectional schematic diagram illustrating the cover plate structure 180 of the embodiment and a surrounding structure thereof. FIG. 11 illustrates a partial section of the energy storage device 10 when the energy storage device 10 is cut by a YZ-plane passing through a line XI-XI in FIG. 3, and the side spacer 700 (see FIG. 2) on the positive side in the X-axis direction is omitted in FIG. 11. The electrode body 400 is simplified and illustrated.

As illustrated in FIG. 11, the tab 420 of the electrode body 400 and the negative electrode current collector 150 are electrically connected to each other through the negative electrode leading plate 155 having a U-shape in section. For example, the connection structure in FIG. 11 is prepared by the following procedure.

For example, an end portion (first end portion) of the plate-like negative electrode leading plate 155 and the tab 420 of the electrode body 400 are joined to each other by ultrasonic welding. For example, an end portion (second end portion) on an opposite side to the first end portion of the negative electrode leading plate 155 is joined to the negative electrode current collector 150 assembled in the cover plate structure 180 by laser welding. Then the negative electrode leading plate 155 is deformed into a U-shape at a predetermined position between the first end portion and the second end portion. Resultantly, the connection structure between the tab 420 of the electrode body 400 and the negative electrode current collector 150 through the negative electrode leading plate 155 having a U-shape in section is formed as illustrated in FIG. 11.

The upper spacer 500 is disposed between the end portion on the side, on which the tab 420 is provided, of the body portion 430 and the cover plate 110. More particularly, the joined portion of the tab 420 and the negative electrode leading plate 155 is partitioned from the body portion 430 of the electrode body 400 by the upper spacer 500. The tab 420 is disposed while inserted in the insertion portion 520 provided in the upper spacer 500. The cushion sheet 600 is sandwiched between the upper spacer 500 and the body portion 430 of the electrode body 400.

The structure around the negative electrode leading plate 155 is illustrated and described in FIG. 11, and the structure around the positive electrode leading plate 145 is also similar. That is, the tab 410 of the electrode body 400 and the positive electrode current collector 140 are electrically connected to each other through the positive electrode leading plate 145 (for example, see FIG. 2) having a U-shape section. The joined portion of the tab 410 and the positive electrode leading plate 145 is partitioned from the body portion 430 of the electrode body 400 by the upper spacer 500, and the tab 410 is disposed while inserted in the insertion portion 520 provided in the upper spacer 500.

The electrode body 400 and the positive electrode current collector 140 are connected to each other through the positive electrode leading plate 145, and the electrode body 400 and the negative electrode current collector 150 are connected to each other through the negative electrode leading plate 155, which allows the lengths (the lengths in the winding axis direction (Z-axis direction)) of the tabs 410 and 420 of the electrode body 400 to be relatively shortened.

That is, the widths (the lengths in the winding axis direction (Z-axis direction)) of the electrode plates necessary for the production of the electrode body 400 can relatively be shortened in the positive electrode 450 and the negative electrode 460. This has an advantage from the viewpoint of production efficiency of the electrode body 400.

As illustrated in FIG. 11, a binding sheet 360 is disposed between the body portion 430 of the electrode body 400 and the insulating sheet 350.

Figure 12:
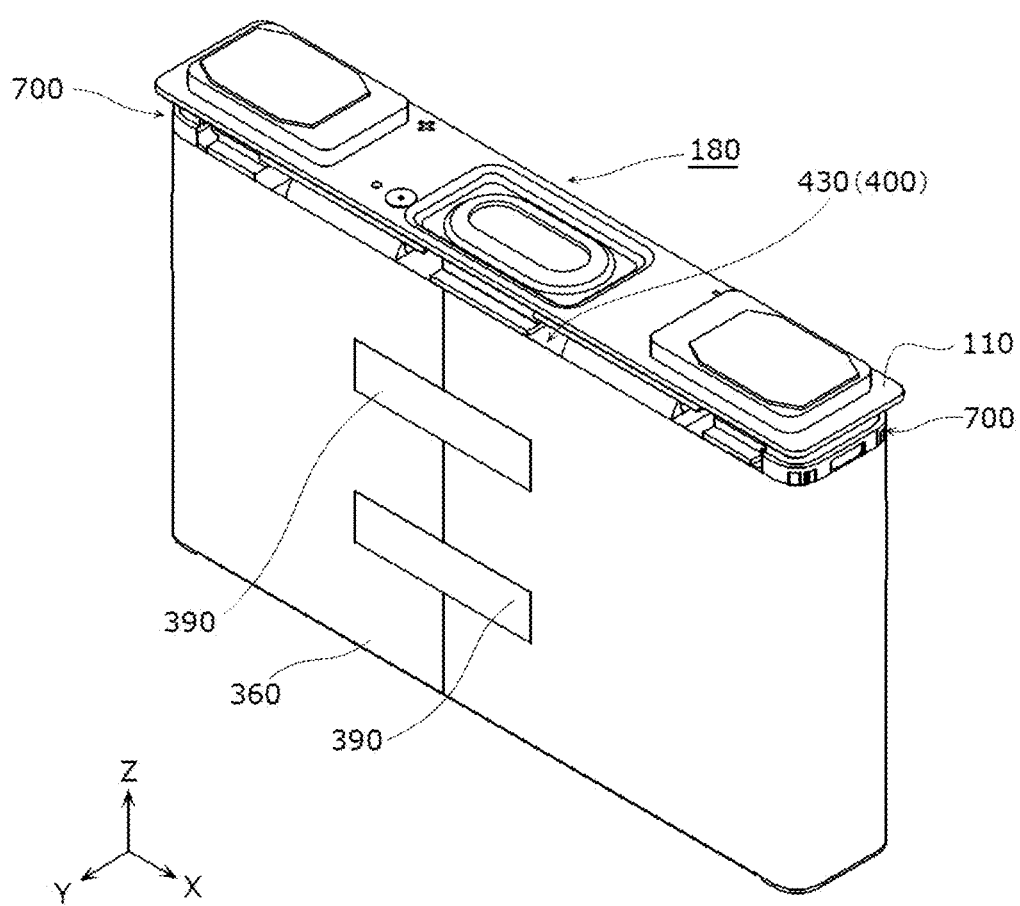
FIG. 12 is a perspective view illustrating a binding state of a binding sheet to the electrode body of the embodiment.

FIG. 12 is a perspective view illustrating a binding state of the binding sheet 360 to the electrode body 400 of the embodiment.

As illustrated in FIG. 12, the binding sheet 360 is wound around the body portion 430 of the electrode body 400. Specifically, the binding sheet 360 is a belt-like member stabilizing the form of the body portion 430, and the binding sheet 360 is wound around the outer periphery of the body portion 430. In the binding sheet 360, one end portion is placed on the other end portion, and the end portions of the binding sheet 360 are fixed to each other by an adhesive tape 390. In addition to the adhesive tape 390, the end portions of the binding sheet 360 may be fixed to each other by an adhesive agent or thermal welding. Alternatively, a cyclic binding member may be used. The binding sheet 360 is made of an insulating material having an electrolyte solution-resistant property. Specifically, PC, PP, PE, or PPS can be cited as an example of the insulating material. The process of winding the binding sheet 360 around the body portion 430 may be eliminated when the form of the body portion 430 is stabilized.

In the adhesive tapes 370, 380 and 390, the substrate is made of an insulating material having an electrolyte solution-resistant property. Specifically, PC, PP, PE, or PPS can be cited as an example of the insulating material. The adhesive layer provided on one surface of the substrate of each of the adhesive tapes 370 and 380 is also formed by an adhesive agent having the electrolyte solution-resistant property and the insulating property.

A method for producing the energy storage device 10 will be described below.

The tab 410 of the electrode body 400 is welded to a flat plate constituting the positive electrode leading plate 145, and the tab 420 of the electrode body 400 is welded to a flat plate constituting the negative electrode leading plate 155. After the cover plate structure 180 is assembled, the flat plate constituting the positive electrode leading plate 145 is welded to the positive electrode current collector 140 of the cover plate structure 180, and the flat plate constituting the negative electrode leading plate 155 is welded to the negative electrode current collector 150. After the welding, the flat plate constituting the positive electrode leading plate 145 and the flat plate constituting the negative electrode leading plate 155 are bent to form the positive electrode leading plate 145 and the negative electrode leading plate 155, respectively.

Then the side spacer 700 is attached to the body portion 430 of the electrode body 400. Specifically, as illustrated in FIG. 7, the side spacer 700 is separately attached in each of the curved portion 431 and 432 of the body portion 430. On the side of the curved portion 431, the side spacer 700 is fixed to the body portion 430 by the adhesive tape 380 after the positioning unit 715 of the side spacer 700 is engaged with the engaging unit 121 of the lower insulating member 120 that is of a part of the cover plate structure 180. On the side of the curved portion 432, the side spacer 700 is fixed by the adhesive tape 380 to the body portion 430 by the similar process. After the fixing, the cover plate 110 that is of a part of the over plate structure 180 abuts on the base 710 that is of one end portion of the side spacer 700 as illustrated in FIG. 10.

Then, as illustrated in FIG. 12, the binding sheet 360 is wound around the body portion 430 of the electrode body 400, and the end portions of the binding sheet 360 are fixed to each other by the adhesive tape 390.

Figure 13:
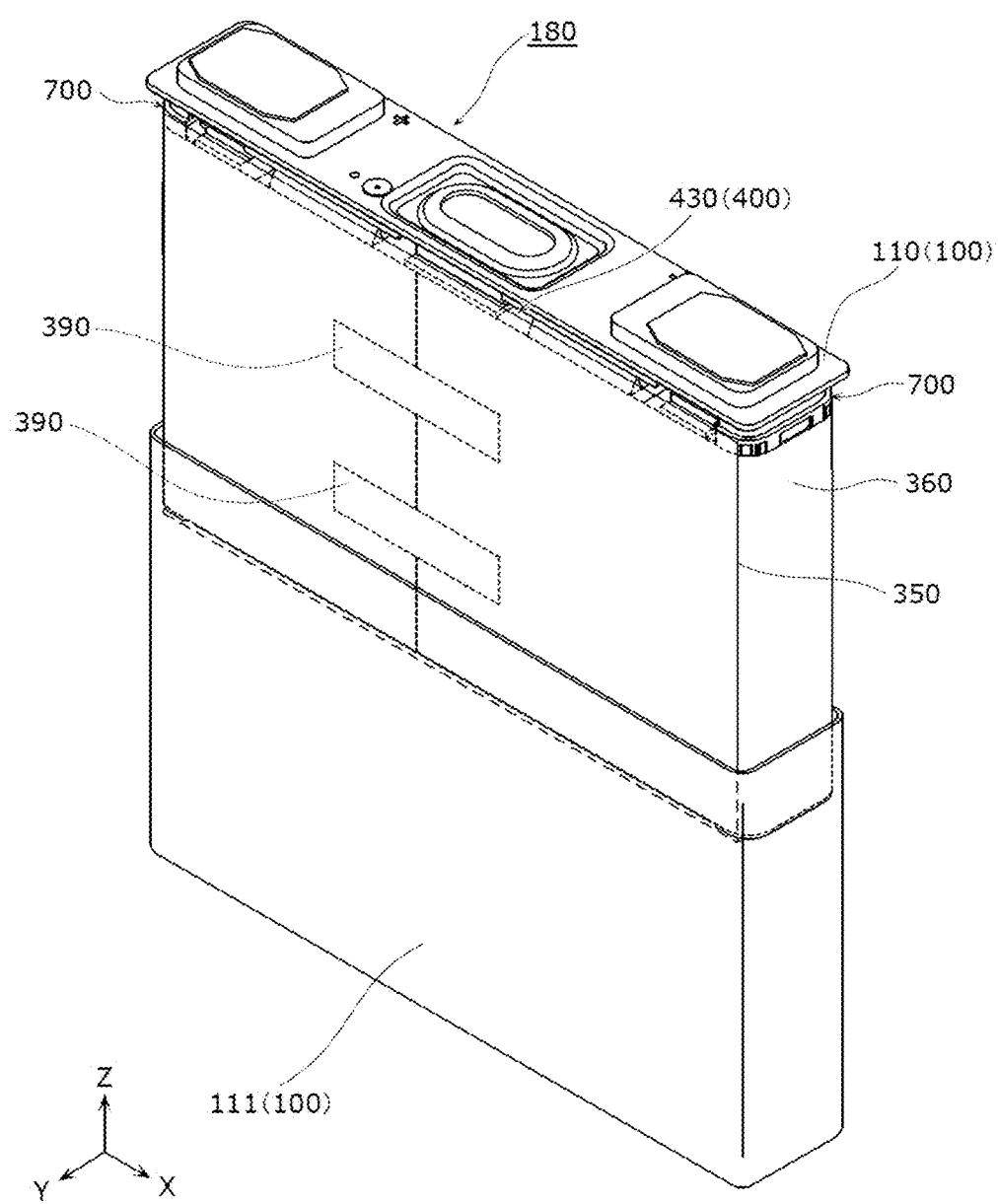
FIG. 13 is a perspective view illustrating one process of an energy storage device production method of the embodiment.

FIG. 13 is a perspective view illustrating one process of a method for producing the energy storage device 10 of the embodiment.

As illustrated in FIG. 13, the electrode body 400 around which the binding sheet 360 is wound is accommodated in the main body 111 of the container 100 in such a state.

Because the base 710 of the side spacer 700 abuts on the cover plate 110 of the cover plate structure 180 as illustrated in FIG. 10, the side spacer 700 and the electrode body 400 move toward the inside of the main body 111 of the container 100 by pushing the cover plate structure 180. Because the side spacer 700 slides along the inner peripheral surface of the main body 111 during the movement, the electrode body 400 is smoothly guided to the inside of the main body 111.

Figure 14:
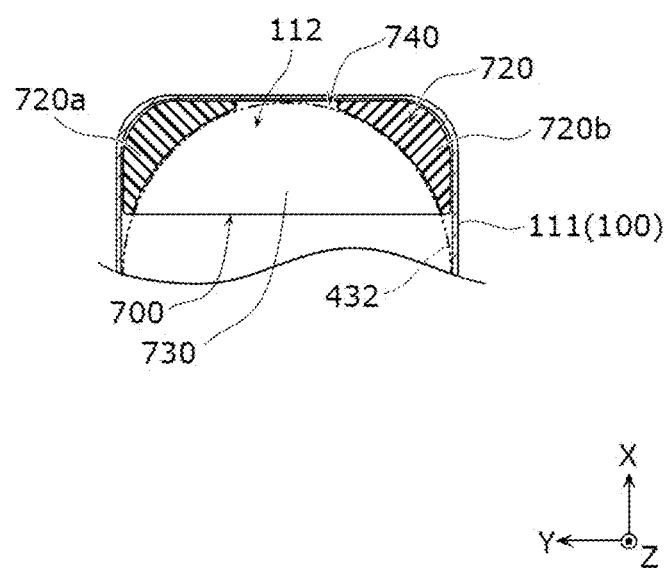
FIG. 14 is a sectional view illustrating a positional relationship among the side spacer, the electrode body, and the container of the embodiment.

FIG. 14 is a sectional view illustrating a positional relationship among the side spacer 700, the electrode body 400, and the container 100 of the embodiment. In FIG. 14, the external form of the curved portion 432 of the body portion 430 of the electrode body 400 is indicated by an alternate long and two short dashes line.

As illustrated in FIG. 14, the side spacer 700 is disposed along the side surface constituting a short side of the accommodation recess 112 when viewed from the winding axis direction. The inner surface shape of the corner of the accommodation recess 112 is rounded. Because the outer surface of the wall 720 of the side spacer 700 constitutes the smooth convex surface so as to correspond to the rounded shape, the side spacer 700 comes close contact with the main body 111 to stably hold the electrode body 400. The curved portion 432 of the electrode body 400 is disposed in the opening 740 of the side spacer 700 such that a part of the surface of the curved portion 432 is flush with the outer surface of the wall 720. Therefore, the body portion 430 of the electrode body 400 can densely be accommodated in the main body 111 while the side spacer 700 is used. When the electrode body 400 and the like are accommodated in the main body 111 of the container 100, one end portion of the body portion 430 of the electrode body 400 faces the cover plate structure 180.

Then the cover plate 110 is welded to the main body 111 to assemble the container 100.

After the electrolyte solution is poured from the electrolyte solution filling port 117, the electrolyte solution filling plug 118 is welded to the cover plate 110 to close the electrolyte solution filling port 117, thereby producing the energy storage device 10.

As described above, in the embodiment, because the cover plate structure 180 abuts partially on one end portion of the side spacer 700 attached to the electrode body 400, the electrode body 400 enters the container 100 together with the side spacer 700 when the cover plate structure 180 is pressed in assembling the electrode body 400 in the container 100. Accordingly, even if the electrode body 400 is not directly pressed, the electrode body 400 can be accommodated in the container 100, and the damage of the electrode body 400 can be prevented during the production.

The side spacer 700 extends from one end portion of the electrode body 400 to the other end portion, so that the side spacer 700 can be slid to the end with respect to the container 100 when the electrode body 400 is accommodated in the container 100. Accordingly, the electrode body 400 can easily be guided to the container 100.

The bottom plate 730 partially covering the other end portion of the electrode body 400 is provided in the other end portion of the side spacer 700, so that the other end portion of the electrode body 400 can be prevented from contacting partially with the container 100 after the electrode body 400 is accommodated in the container 100. Therefore, the damage of the electrode body 400 can further be prevented.

The top plate 711 partially covering one end portion of the electrode body 400 is provided in the side spacer 700, so that one end portion of the electrode body 400 can be prevented from contacting with the container 100 after the electrode body 400 is accommodated in the container 100. Therefore, the damage of the electrode body 400 can further be prevented.

The engaging unit 131 of the cover plate structure 180 engages the positioning unit 715 of the side spacer 700 to position the cover plate structure 180 with respect to the side spacer 700. Accordingly, the electrode body 400 can be accommodated in the container 100 while the positional relationship between the side spacer 700 and the cover plate structure 180 is stabilized.

The lower insulating member 130 is provided between the cover plate 110 and the electrode body 400, so that the insulating property between the cover plate 110 and the electrode body 400 can be maintained by the lower insulating member 130. The engaging unit 131 is provided in the lower insulating member 130, so that the position of the lower insulating member 130 can be stabilized.

Because one end portion of the side spacer 700 separates from the electrode body 400 in the winding axis direction, the side spacer 700 does not interfere with one end portion of the electrode body 400 even if the cover plate structure 180 is pushed. Therefore, the damage of the electrode body 400 can further be prevented during the production.

Even if the tabs 410 and 420 are provided in the electrode body 400, the damage of the tabs 410 and 420 can be prevented because the electrode body 400 can be accommodated in the container 100 without directly pressing the electrode body 400.

Because the portion abutting on the side spacer 700 of the cover plate structure 180 is the cover plate 110, the portion can be formed more easily than the case that another portion abuts on the side spacer 700.

(Other embodiments)

The energy storage device of the invention is described above based on the embodiment. However, the present invention is not limited to the embodiment. Various modifications of the embodiment that are made by those skilled in the art or various configurations constructed by a combination of the plural components are also included in the present invention as long as the modifications and the configurations do not depart from the scope of the present invention.

For example, the number of electrode bodies 400 included in the energy storage device 10 is not limited to one, but at least two electrode bodies 400 may be provided. In the case that the energy storage device 10 includes the plural electrode bodies 400, a dead space can be reduced in a corner of the container 100 compared with the case that the single electrode body 400 is accommodated in the container 100 having the identical volume (capacity). A ratio of the electrode body 400 to the capacity of the container 100 can be increased, and therefore the capacity of the energy storage device 10 can be increased.

There is no particular limitation to a positional relationship between the positive electrode-side tab 410 and the negative electrode-side tab 420 in the electrode body 400. For example, in the winding type electrode body 400, the tabs 410 and 420 may be disposed on the opposite side to each other in the winding axis direction. In the case that the energy storage device 10 includes the laminated type electrode body, the positive electrode-side tab and the negative electrode-side tab may be provided while projecting in different directions, when the positive electrode-side tab and the negative electrode-side tab are viewed from the laminated direction.

The electrode body 400 included in the energy storage device 10 is not always formed into the winding type. For example, the energy storage device 10 may include a stacked type electrode body in which plate-like electrode plates are stacked. For example, the energy storage device 10 may include an electrode body having a bellows-shaped stacked structure formed by repeating a mountain fold and a valley fold of an elongated belt-like electrode plate.

The side spacer 700 may be formed into any shape as long as the curved portions 431 and 432 can be exposed from one end to the other end of the electrode body 400 in the winding axis direction. In the embodiment, by way of example, the integral side spacers 700 are separately provided in the curved portions 431 and 432 of the electrode body 400. Alternatively, the side spacer may be divided.

Figure 15:
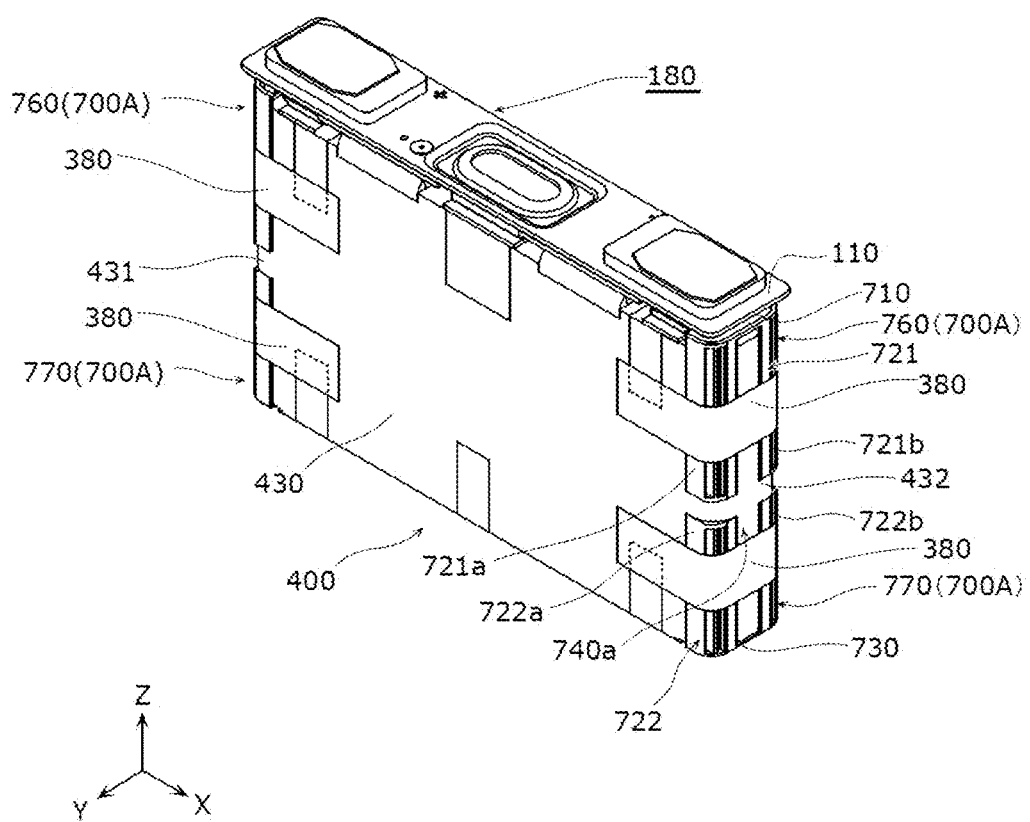
FIG. 15 is a perspective view illustrating a state in which a side spacer according to a modification of the embodiment is attached to the electrode body.

FIG. 15 is a perspective view illustrating a state in which a side spacer according to a modification of the embodiment is attached to the electrode body 400. In the following description, sometimes the same component as the above embodiment is designated by the same reference sign to omit the description thereof.

As illustrated in FIG. 15, a side spacer 700A is one in which the side spacer 700 of the embodiment is divided with respect to the substantial center in the Z-axis direction, and the side spacer 700A includes a first member 760 and a second member 770. The first member 760 includes the base 710 and a wall 721. The second member 770 includes the bottom plate 730 and a wall 722. There is a predetermined space between the wall of the first member 760 and the wall 722 of the second member 770 in the Z-axis direction. A slit between the first wall 721a and the second wall 721b in the wall 721 and a slit between the first wall 722a and the second wall 722b in the wall 722 constitute an opening 740a. The surfaces of the curved portions 431 and 432 are partially exposed from one end to the other end of the electrode body 400 in the winding axis direction by the opening 740a.

In the embodiment, by way of example, the side spacers 700 are separately provided in the curved portions 431 and 432 of the electrode body 400. Alternatively, the plural side spacers may integrally be provided.

Figure 16:
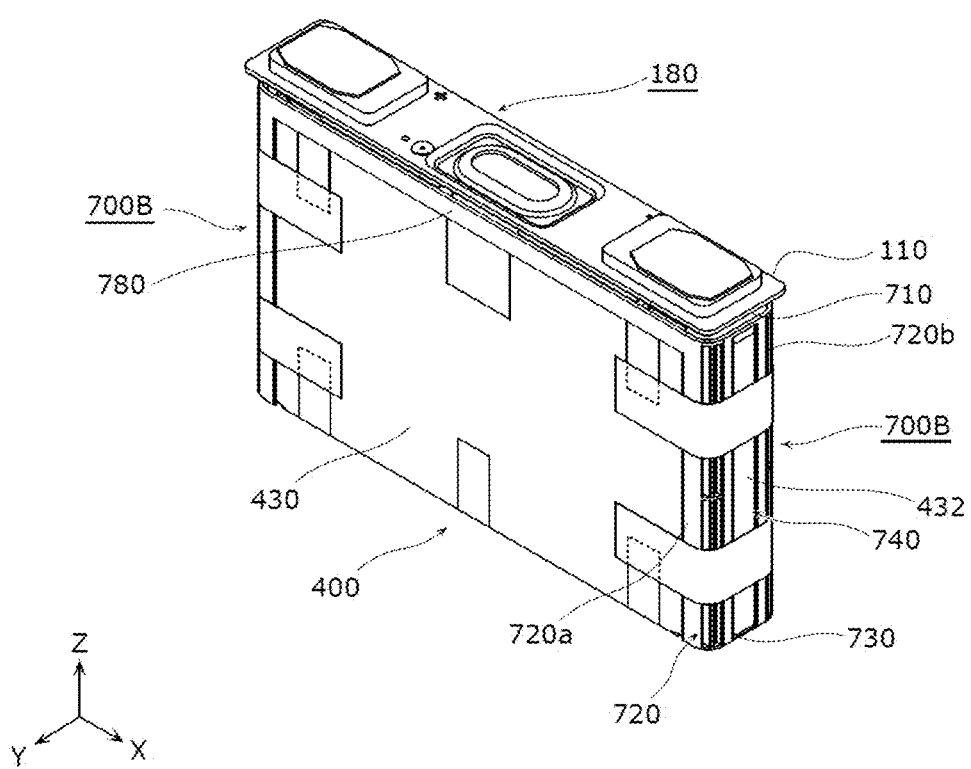
FIG. 16 is a perspective view illustrating a state in which a side spacer according to another modification of the embodiment is attached to the electrode body.

FIG. 16 is a perspective view illustrating a state in which a side spacer according to another modification of the embodiment is attached to the electrode body 400.

As illustrated in FIG. 16, side spacers 700B attached to each of the curved portion 431 and 432 are integrally joined to each other by a beam 780. Specifically, the beam 780 extending in the X-axis direction is bridged in one end portion of each of the side spacers 700B. The beam 780 may be placed on any point as long as a capacity of the electrode body 400 is not largely decreased. Thus, because the pair of side spacers 700B is integrally formed by the beam 780, rigidity can be enhanced, and the assembly can easily be performed.

In the embodiment, the outer surface of the wall 720 of the side spacer 700 is the smooth convex surface by way of example. Alternatively, the outer surface of the wall 720 may be formed into any shape as long as the outer surface corresponds to the inner surface shape of the main body 111 of the container 100.

Figure 17:
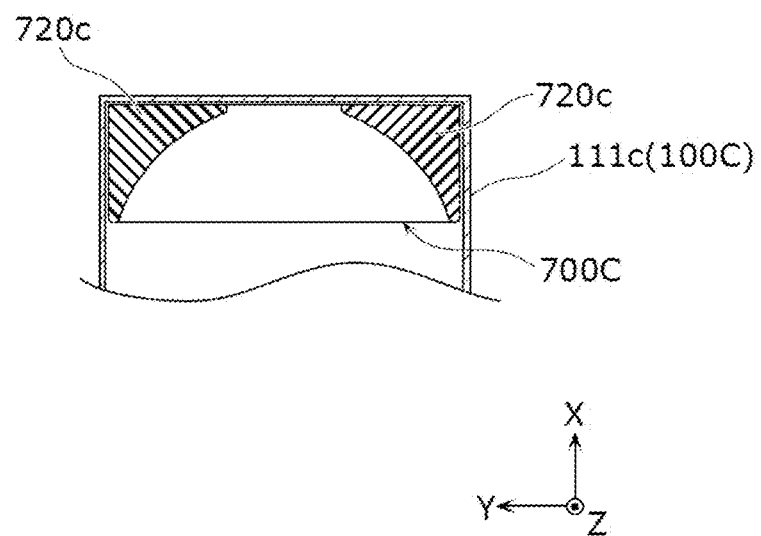
FIG. 17 is a sectional view illustrating a positional relationship between a side spacer according to still another modification of the embodiment and the container.

FIG. 17 is a sectional view illustrating a positional relationship between a side spacer according to still another modification of the embodiment and the container 100.

As illustrated in FIG. 17, a main body 111c of a container 100C is formed into an inner surface shape having a substantially right angle corner. An outer surface of the wall 720c of the side spacer 700C is formed into a shape having the substantially right angle corner corresponding to the inner surface shape of the main body 111c. Even in this case, the side spacer 700C is comes into close contact with the main body 111c, so that the electrode body 400 can stably be held.

In the embodiment, by way of example, the cover plate 110 abuts on the base 710 that is of one end portion of the side spacer 700. Alternatively, a target abutting on the base 710 may be a portion other than the cover plate 110 as long as the portion is included in the cover plate structure 180, and the target may be a member (such as the lower insulating members 120 and 130, the positive electrode current collector 140, and the negative electrode current collector 150) that is located inside the container 100 with respect to the cover plate 110.

In the embodiment, by way of example, the positioning unit 715 of the side spacer 700 is the leading end portion of the inner wall 714a, and the engaging unit 131 of the cover plate structure 180 includes the recess 131a engaging the positioning unit 715. However, the positioning unit 715 and the engaging unit 131 may be formed into any shape as long as the positioning unit 715 and the engaging unit 131 can be engaged and positioned. For example, the positioning unit 715 is formed into a boss projecting in a Z-axis direction, and a hole into which the boss is inserted may be provided in the engaging unit 131. In this case, the movement in the X-axis direction can be controlled in addition to the Y-axis direction.

In the embodiment, by way of an example, the energy storage device 10 includes the insulating sheet 350 and the binding sheet 360. However, it is not always necessary to provide the insulating sheet 350 and the binding sheet 360.

It is noted that a configuration constructed by any combination of the embodiment and the modifications is also included in the present invention.

INDUSTRIAL APPLICABILITY

The present invention can be applied to energy storage devices such as a lithium ion secondary battery.

DESCRIPTION OF REFERENCE SIGNS 10 energy storage device
100, 100C container
110 cover plate
110a through-hole
110b through-hole
111, 111c main body
112 accommodation recess
113 bottom
117 electrolyte solution filling port
118 electrolyte solution filling plug
120,130 lower insulating member
120a, 130a through-hole
120b, 130b engagement projection
hole 121, 131 engaging unit
122, 132 attaching unit
125, 135 upper insulating member
125a, 126, 135a, 140a, 150a through-hole
131a notch
133 rib
140 positive electrode current collector
145 positive electrode leading plate
150 negative electrode current collector
155 negative electrode leading plate
160 swelling unit
170 safety valve
180 cover plate structure
200 positive electrode terminal
210, 310 fastening unit
300 negative electrode terminal
350 insulating sheet
360 binding sheet
370, 380, 390 adhesive tape
400 electrode body
410, 420 tab
411, 421 projection
430 body portion
431, 432 curved portion
450 positive electrode
460 negative electrode
470a, 470b separator
470c, 470d stick-out portion
500 upper spacer
510 latch
520 insertion portion
600 cushion sheet
700, 700A, 700B, 700C side spacer (spacer)
710 base
711 top plate
712 wall portion
713 peripheral wall
714, 714a, 714b inner wall
715 positioning unit
720, 720c, 721, 722 wall
720a, 721a, 722a first wall
720b, 721b, 722b second wall
730 bottom plate
740, 740a opening
760 first member
770 second member
780 beam

The invention claimed is:

1. An energy storage device, comprising:
an electrode body in which an electrode is stacked;
a container in which the electrode body is accommodated;
a cover plate structure including a cover plate that closes the container; and
a first spacer and a second spacer abutting opposing sides of the electrode body, one end portion of each of the first spacer and the second spacer abutting on a part of the cover plate structure in a first direction,
wherein the electrode body includes a body portion and a tab projecting from one end portion of the body portion toward the cover plate,
wherein the electrode body is disposed between the first spacer and the second spacer in a second direction that intersects with the first direction,
wherein the first spacer includes a top plate interposed between the one end portion of the body portion and the one end portion of the first spacer in a winding axis direction of the electrode body, and
wherein the top plate extends in the second direction toward the second spacer.

2. The energy storage device according to claim 1, wherein the energy storage device is produced by a method that comprises:
winding the electrode to form a curved portion;
pushing the cover plate structure while the one end portion of the first spacer, on the cover plate structure side attached to the electrode body, abuts on the part of the cover plate structure; and
accommodating the electrode body in the container while the one end portion, in the winding axis direction of the electrode body, faces the cover plate structure.

3. The energy storage device according to claim 1, further comprising a current collector,
wherein the tab is electrically connected to the current collector on one end portion of the electrode body in the first direction, and
wherein the first spacer extends from the one end portion of the electrode body to an other end portion of the electrode body in the first direction.

4. The energy storage device according to claim 1, further comprising a current collector,
wherein the tab is electronically connected to the current collector on one end portion of the electrode body in the first direction.

5. The energy storage device according to claim 1, further comprising a current collector,
wherein the tab is electrically connected to the current collector on one end portion of the electrode body in the first direction, and
wherein the one end portion of the first spacer protrudes from the one end portion of the body portion in the first direction.

6. The energy storage device according to claim 1, further comprising:
a current collector electrically connected to the electrode body,
wherein the current collector is disposed between an upper surface of the electrode body and the cover plate, the tab projecting from the upper surface of the body portion toward the current collector.

7. The energy storage device according to claim 1, wherein, in the winding axis direction of the electrode body, the tab projects from the one end portion of the body portion toward the cover plate.

8. The energy storage device according to claim 1 wherein, in the winding axis direction of the electrode body, the top plate of the first spacer overlaps with the one end portion of the body portion.

9. An energy storage device, comprising:

an electrode body in which an electrode is stacked;

a container in which the electrode body is accommodated;

a cover plate structure including a cover plate that closes the container;

a current collector electrically connected to the electrode body; and a first spacer and a second spacer abutting opposing sides of that abuts the electrode body, one end portion of each of the first spacer and the second spacer abutting on a part of the cover plate structure in a first direction, wherein the electrode body includes a body portion and a tab, the tab being electrically connected to the current collector on one end portion of the electrode body in the first direction, wherein the first spacer includes a top plate interposed between one end portion of the body portion and the one end portion of the first spacer in the first direction and covers a part of the one end portion of the body portion, and wherein the first spacer is a unitary piece that includes the top plate and a wall extending from a surface of the top plate in the first direction.

10. The energy storage device according to claim 9, wherein the current collector is disposed between an upper surface of the electrode body and the cover plate, the tab projecting from the upper surface of the body portion toward the current collector.

11. The energy storage device according to claim 9, wherein the first direction includes a winding axis direction of the electrode body, and wherein, in the winding axis direction of the electrode body, the top plate of the spacer overlaps with the one end portion of the body portion.

* * * * *